US011980954B1

(12) United States Patent
Garrett et al.

(10) Patent No.: US 11,980,954 B1
(45) Date of Patent: May 14, 2024

(54) PORTABLE AUTOMATED NOTCHING MACHINE

(71) Applicant: ABG Design LLC, Franklin, TN (US)

(72) Inventors: Miller Caldwell Garrett, Franklin, TN (US); Nicholas Keith Anselmo, Yorktown, VA (US); Taylor Louis Bobrow, Chesapeake, VA (US)

(73) Assignee: ABG Design LLC, Franklin, TN (US)

( * ) Notice: Subject to any disclaimer, the term of this patent is extended or adjusted under 35 U.S.C. 154(b) by 132 days.

(21) Appl. No.: 17/677,034

(22) Filed: Feb. 22, 2022

Related U.S. Application Data

(60) Provisional application No. 63/152,448, filed on Feb. 23, 2021.

(51) Int. Cl.
*B23D 21/04* (2006.01)
*B23B 3/26* (2006.01)
(Continued)

(52) U.S. Cl.
CPC ................... *B23D 23/02* (2013.01)

(58) Field of Classification Search
CPC ......... B23B 5/167; B23B 5/161; B23B 27/06; B23B 2200/0447; B23B 2200/3627; B23B 2205/10; B23B 2210/02; B23B 2215/72; B23B 2220/28; B23B 5/16; B23B 2270/025; B23B 5/162; B23D 21/04; B23D 5/163; B23D 37/0276; B23K 37/0531; B23K 37/0533; B23K 20/26; B23K 37/0288; B23K 26/38; B23K 2101/06; B23Q 5/08; B23Q 2705/12

USPC .............. 83/39; 219/121.85, 121.67, 121.72, 219/121.39, 121.58; 228/32, 33, 47.1, 49, 228/44.5
See application file for complete search history.

(56) References Cited

U.S. PATENT DOCUMENTS 11,642,742 B2 * 5/2023 Liu ......................... B23K 26/38
219/121.67
2015/0174661 A1 * 6/2015 Brandstrom ....... B23K 37/0276
228/9
(Continued)

FOREIGN PATENT DOCUMENTS

CN 111299871 A * 6/2020 ........... B23K 26/702
KR 20140071530 A * 6/2014 ............. G01B 11/14

*Primary Examiner* — Ghassem Alie
(74) *Attorney, Agent, or Firm* — Patterson Intellectual Property Law, PC

(57) ABSTRACT

A portable machine includes a controller to receive target parameters associated with a workpiece to be worked. A front assembly includes a first baseplate which is stationary during operation, a first actuator to controllably move the workpiece bidirectionally along a longitudinal axis thereof, a second actuator to controllably rotate a second baseplate relative to the first baseplate, and at least one tooling unit. A rear assembly includes a third baseplate with a rolling base, a fourth baseplate rotatably coupled to the third baseplate, and a rear workpiece clamp. Sensors generate signals representing a distance between the first and third baseplates, an orientation of the first baseplate relative to the second baseplate, and an orientation of the third baseplate relative to the fourth baseplate. The controller generates control signals to the tooling unit and the first and second actuators based on at least the target parameters and the sensor signals.

6 Claims, 7 Drawing Sheets

(51) Int. Cl.
*B23B 5/08* (2006.01)
*B23B 5/14* (2006.01)
*B23D 23/02* (2006.01)
*B26D 3/16* (2006.01)

(56) References Cited

U.S. PATENT DOCUMENTS

2016/0121406 A1\* 5/2016 Weinberg ................ B23B 5/161
　　　　　　　　　　　　　　　　　　　　　　407/113
2019/0126367 A1\* 5/2019 Tripp ........................ B23B 5/16

\* cited by examiner

PORTABLE AUTOMATED NOTCHING MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to tube notching machines, and more particularly to a new type of notching machine that is portable and automated by removing extra structure found in typical notching machines and by adding controls and motors for moving a workpiece through the machine.

It is known to use traditional notching machines to mark, notch, or otherwise modify an extruded tube or other workpiece. These traditional notching machines are typically large and cumbersome, particularly if they use multiple tool sets or perform multiple functions. These machines require space at least as large as the workpiece being notched or otherwise worked on, and frequently include large extra structures for supporting both the workpiece and the tools. As such, typical machines in this space either fall short in their capabilities to save space or require large investments in both money and space for full functionality.

The less functional machines require users to manually move the workpiece to allow the tools to operate on different parts of the workpiece. An example of the more functional, larger, and more expensive machines is an automated CNC tube notcher. The two core components in these CNC-style machines are a cutting/tool head located at the front end of the machine, and a system to accurately manipulate the raw extrusion material (the workpiece) under this tool head to perform the desired operations (typically located at the rear of the assembly). The machines currently employed for these types of processes use a fully constrained mechanical system to perform the manipulation of the workpiece. This consists of a clamp located at the rear of the workpiece that is used to rotate the workpiece along its major axis, and also move linearly along a track that is aligned parallel to this axis. While this layout is simple and accurate, it requires the machine to be at least as large as the raw material being formed, in many cases 20 feet or greater.

The present invention provides the functionality of the CNC tube notcher in a much more accessible format through a few key changes to the conventional machine form-factor, allowing the machine to not only save space and money, but also for the new machine to be portable. The present invention provides the functionality of higher-end, fully-automated notching and marking systems into a portable form factor without compromising accuracy or speed. By shrinking the size of the components and approaching the design of the machine in a radical new way, the machine cuts the price to manufacture by up to 10× vs competing products.

The portability is useful in many applications, such as off-road vehicle events. Participants in these events frequently need to modify a tube frame chassis or other components to pass technical inspection, and participants also frequently modify components that break in the field to either replace or reinforce the component on-site.

BRIEF SUMMARY

Various embodiments of an apparatus as disclosed herein relate to a portable machine to improve accessibility to high precision, computer-controlled manufacturing equipment. More particularly, the portable machine may facilitate the manipulation, cutting, and marking of extruded pieces of stock material (referenced herein as the "workpiece," primarily but without limitation metal tubes). The portable machine in accordance with embodiments as disclosed herein may further provide the functionality of higher-end, fully-automated notching and marking systems in a portable form factor without compromising accuracy or speed. By shrinking the size of the components and approaching the design of the machine in a radical new way, the machine dramatically reduces manufacturing costs.

In an embodiment, a portable machine for working of a workpiece as disclosed herein includes a controller configured to receive target parameters for a project associated with the workpiece to be worked. A front assembly further includes a first front assembly baseplate comprising a base, for supporting the front assembly from a support surface in a stationary manner during working of the workpiece, and a portion having a substantially planar face extending from the base and perpendicular thereto. A front workpiece holder is associated with said portion of the first front assembly baseplate and configured for receiving a workpiece throughout movement along a longitudinal axis thereof. A second front assembly baseplate is configured for rotatable movement relative to said portion of the first front assembly baseplate. A first actuator is configured in response to control signals from the controller to move the workpiece in a first direction or an opposing second direction along the longitudinal axis, and a second actuator is configured in response to control signals from the controller to rotate the second front assembly baseplate in relation to the first front assembly baseplate. At least one tooling unit is attached to the first front assembly baseplate and configured to work the workpiece in accordance with the target parameters for the project. A rear assembly is also provided and further includes a first rear assembly baseplate comprising a rolling base configured to roll along the support surface and a portion having a substantially planar face extending from the rolling base and perpendicular thereto. A second rear assembly baseplate is rotatably coupled to said portion of the first rear assembly baseplate, and a rear workpiece clamp is also associated with the second rear assembly baseplate. One or more sensors are configured to generate signals representing a distance between the first front assembly baseplate and the first rear assembly baseplate, an orientation of the first front assembly baseplate relative to the second front assembly baseplate, and an orientation of the first rear assembly baseplate relative to the second rear assembly baseplate. The controller is configured to receive the signals from the one or more sensors and to generate the control signals to the first and second actuators based on the target parameters and the signals from the one or more sensors.

In one exemplary aspect according to the above-referenced embodiment, the one or more sensors may include a distance sensor configured to calculate distance measurements using a laser reflecting off a target area on the rear assembly. The controller may further send control signals to the first actuator based on the distance measurements to move the workpiece a desired distance in a desired direction along the longitudinal axis.

In another exemplary aspect according to the above-referenced embodiment, the controller is further configured to monitor the movement of the first actuator relative to a starting point to measure the longitudinal distance travelled by the workpiece, in combination with the distance measurements via the distance sensor.

In another exemplary aspect according to the above-referenced embodiment, the controller is further configured to monitor the movement of the first actuator relative to a defined starting point to measure the longitudinal distance travelled by the workpiece.

In another exemplary aspect according to the above-referenced embodiment, the one or more sensors may include a first rotation sensor attached to the first front assembly baseplate that generates signals corresponding to an orientation of the second front assembly baseplate relative to the first front assembly baseplate, and/or a second rotation sensor attached to the first rear assembly baseplate that generates signals corresponding to an orientation of the second rear assembly baseplate relative to the first rear assembly baseplate.

In another exemplary aspect according to the above-referenced embodiment, the controller may be further configured to predict a stability of one or more of the front assembly and the rear assembly, based on a determined weight and/or configuration of the workpiece further in combination with a determined weight and/or relative position of the front assembly and the rear assembly, and generate an output signal corresponding to a predicted stability being outside of one or more defined bounds.

In another exemplary aspect according to the above-referenced embodiment, the output signal may be provided to a display unit for generating a user alert.

In another exemplary aspect according to the above-referenced embodiment, the output signal may be provided to trigger a safety mechanism during movement of the machine.

In another exemplary aspect according to the above-referenced embodiment, the tooling unit comprises a cutting tool and/or a marking tool.

In another exemplary aspect according to the above-referenced embodiment, the portable machine further includes a first aperture extending through the first front assembly baseplate and the second front assembly baseplate, and a second aperture extending through the first rear assembly baseplate and the second rear assembly baseplate, wherein the front workpiece holder holds the workpiece in the first aperture, and the rear workpiece holds the workpiece in the second aperture.

In another exemplary aspect according to the above-referenced embodiment, the one or more sensors may be configured to generate signals representing an orientation of the first front assembly baseplate relative to the first rear assembly baseplate, and the controller may be further configured to generate control signals to one or more further actuators for correcting the first rear assembly baseplate via at least movement of the rolling base.

In another exemplary aspect according to the above-referenced embodiment, the one or more position sensors are configured to detect an orientation of the workpiece and take one or more readings while the portable machine moves the workpiece. The portable machine configured to determine a front assembly-workpiece offset, a rear assembly-workpiece offset, and a rear assembly-front assembly rotation axes offset based on the changes in orientation in each reading of the one or more position sensors. In some embodiments, the position sensor is a camera.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
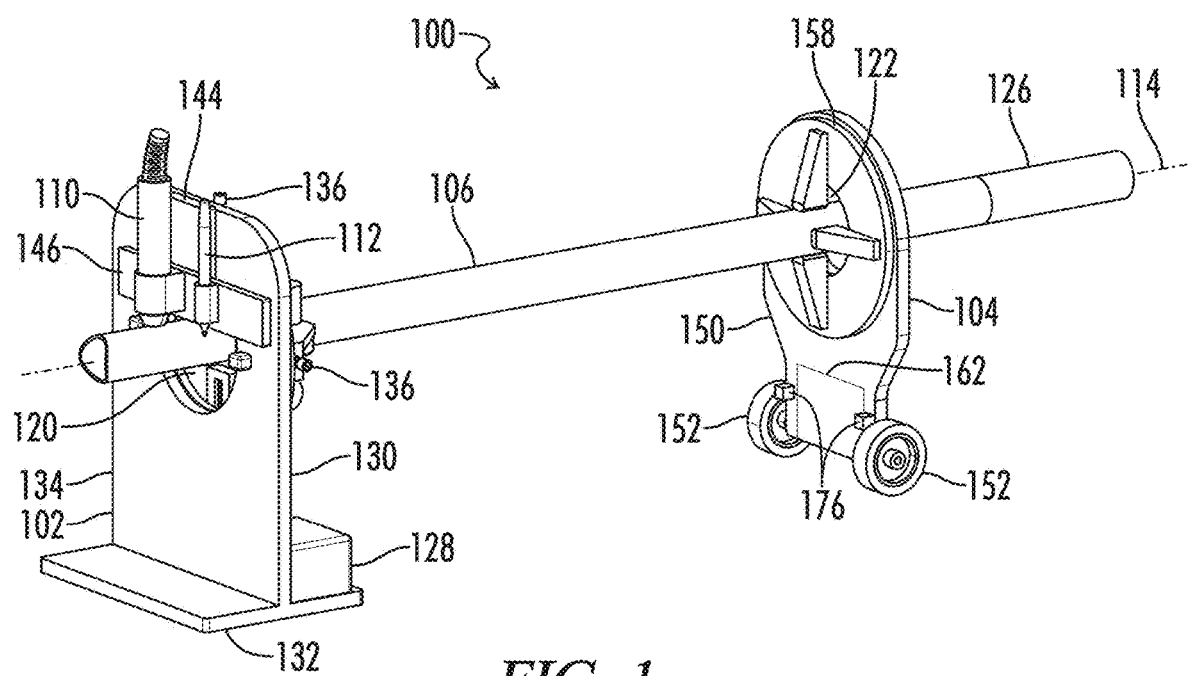
FIG. 1 is a perspective view of an embodiment of a portable system as disclosed herein, in simplified model.

Referring generally to FIGS. 1-7 various exemplary embodiments of an invention may now be described in detail. Where the various figures may describe embodiments sharing various common elements and features with other embodiments, similar elements and features are given the same reference numerals and redundant description thereof may be omitted below.

As illustrated in FIG. 1, an exemplary embodiment of a machine 100 as disclosed herein enables the removal of any physical connection between the front and rear assemblies 102, 104 of the machine 100, allowing the workpiece 106 itself to provide the connecting structure. The machine 100 is capable of working with workpieces 106 of different sizes and form factors, such as circular, rectangular, and square tubes. In doing so, the machine 100 may be provided in a configuration no larger than a conventional suitcase, making it both more accessible to those with constraints on space and also portable for operation in the field.

Figure 2:
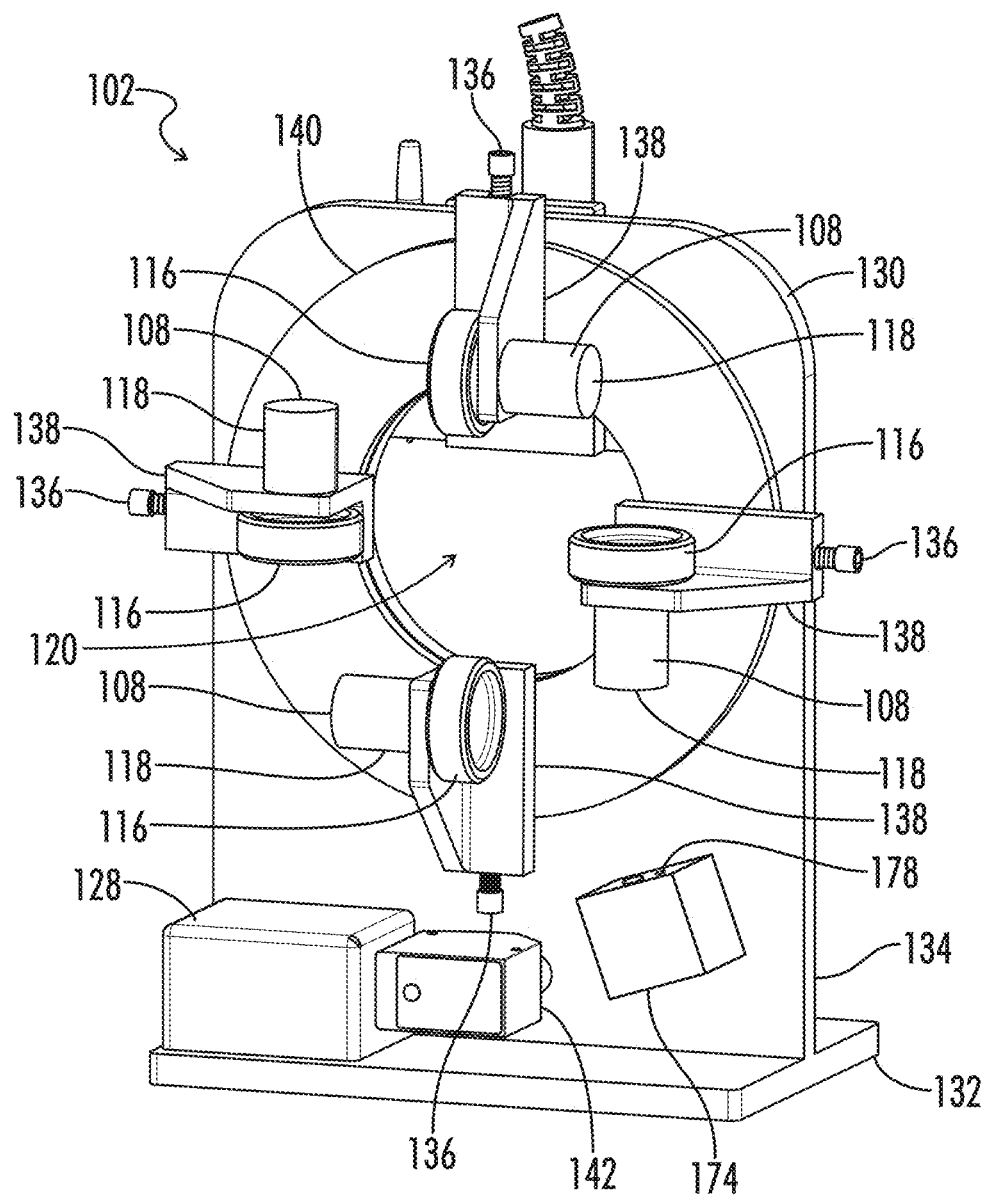
FIG. 2 is a perspective view of a first side of the front assembly according to the embodiment of FIG. 1.
Figure 3:
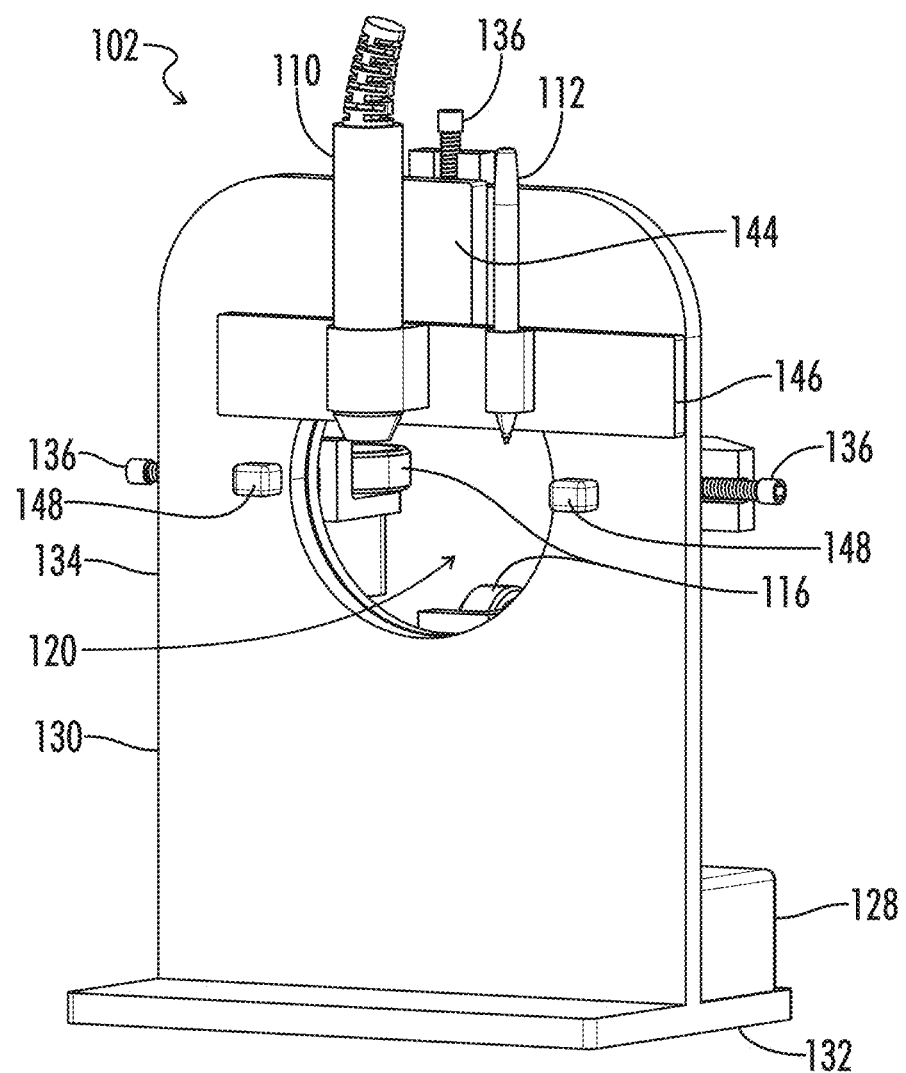
FIG. 3 is a perspective view of a second side of the front assembly according to the embodiment of FIG. 1.

In one embodiment, to make this new layout function, the typical mechanical system for manipulating the workpiece 106 is changed to an actuator 108, such as a newly developed direct friction drive assembly, represented in FIG. 2, that is located on the front assembly 102 of the machine 100. The machine 100 may also include a tooling unit 110, 112 as represented in FIG. 3. The tooling unit may include a cutting head 110, a marking tool 112, and the like as may be appreciated by one of skill in the art. The actuator 108 allows the machine 100 to push and/or pull the workpiece 106 along its longitudinal axis 114. The actuator 108 may also be capable of rotating the workpiece 106 around the longitudinal axis 114 by using, for example, a set of driven rollers 116 configured on a rotating subassembly 118 such that they can be adjusted for different workpiece size and form factors. In this example embodiment, the machine 100 is further configured such that the rear assembly 104, shown in FIG. 4, plays a more passive role. The rear assembly 104's primary function may be to support the end of the workpiece 106 during operation, to provide a target for distance sensing from the front assembly 102, and to provide an additional, absolute reference for the rotation of the workpiece 106 throughout the process.

The portable machine 100 in the illustrated embodiment is primarily composed of front and rear assemblies 102, 104. The front assembly 102 includes a front aperture 120 and the rear assembly 104 includes a rear aperture 122, along with various elements as further described herein for holding the workpiece 106 and driving the workpiece 106 through the front aperture 120, thereby connecting the two assemblies 102, 104 during operation. The front and rear apertures 120, 122 may for example each include a clamp 124 or similar structure for holding the workpiece 106.

In addition to the aforementioned parts of the machine 100, some embodiments may include a tool that acts to enable the machine 100 to operate on the full length of the workpiece 106, called the "tube extension tool" 126. This extension 126 allows the workpiece 106 to be fully extended through the front of the machine 100, so that the tools located there will be able to reach the end of the workpiece 106, avoiding the circumstance wherein for example the 6-10 inches at the end of the workpiece 106 may otherwise not be machined. An exemplary tube extension tool 126 allows a user to first insert the extension 126 into a workpiece 106, then install the extension 126 into the rear aperture 122 as usual. In an embodiment, a separate extension tool 126 can be made for each profile and size (e.g., outer diameter) of workpiece 106 such that the extension tool 126 can have the same outside diameter as the workpiece 106. In other embodiments, a single extension tool 126 may be customizable for two or more different profile and/or size characteristics. Some embodiments of an extension tool 126 as disclosed herein may also include an internal clamping mechanism to tightly hold the workpiece 106 in place for user or otherwise manual manipulation.

Referring more particularly to FIG. 2, the illustrated embodiment of the machine 100 includes a control module 128 which may for example further include a controller. A first (stationary) front assembly baseplate 130 as shown may be provided with a base portion 132 which supports a perpendicularly arrayed portion 134 upon which the following elements are disposed. A friction drive motor (not expressly shown) may be functionally linked to actuator rollers 116, which may take the form of friction drive wheels, with respective drive wheel adjustment mechanisms 136 and adjustable drive wheel support 138 for further enabling manual adjustment to a respective point of engagement with a workpiece 106 extending through the aperture 120. The actuator rollers 116 may be configured to move a workpiece 106 of any shape. Alternatively, if the actuator rollers 116 are not able to move a workpiece 106 of a particular shape, the actuator rollers 116 may be replaced with alternative actuator rollers configured to move the workpiece 106. A second (rotation axis) front assembly baseplate 140 is coupled to the first front assembly baseplate 130 and configured to rotate respective to the stationary orientation of the first front assembly baseplate 130, along with the actuator rollers 116, drive wheel adjustment mechanisms 136, and adjustable drive wheel support 138. A remote distance sensor 142 is functionally linked to the control module 128 and configured to generate signals representative of a distance between the front assembly 102 and a rear assembly 104 as further disclosed herein.

FIG. 3 illustrates an exemplary embodiment of a second side of the front assembly 102 for the portable machine 100, with a vertical motion axis 144 and a horizontal motion axis 146 respectively identified. The terms "front," "rear," "vertical," "horizontal," and the like are used herein for illustrative purposes and with reference to a selected orientation of the portable machine 100 and its respective components, but are not considered to be limiting on the scope of the present disclosure unless otherwise specifically noted. A tooling unit may take numerous potential forms, for example a cutting tool 110, a marking tool 112, or like equivalents as known to those of skill in the art. One or more workpiece 106 locating and compensation sensors 148 may further be provided, for example on opposing sides of the apertures, 120, 122 through the first and second front assemblies 102, 104, and configured to generate signals to the control module 128 corresponding to a current location of a workpiece 106 engaged there within. It is noted that many of the features on the front assembly 102 may be rearranged as necessary on front assembly 102. For example, the cutting tool 110 could be moved to the opposite side of the front assembly 102 for the embodiment shown in FIG. 2, or the control module may similarly be moved to the opposite side of the front assembly 102 from the embodiment shown in FIG. 3.

Figure 4:
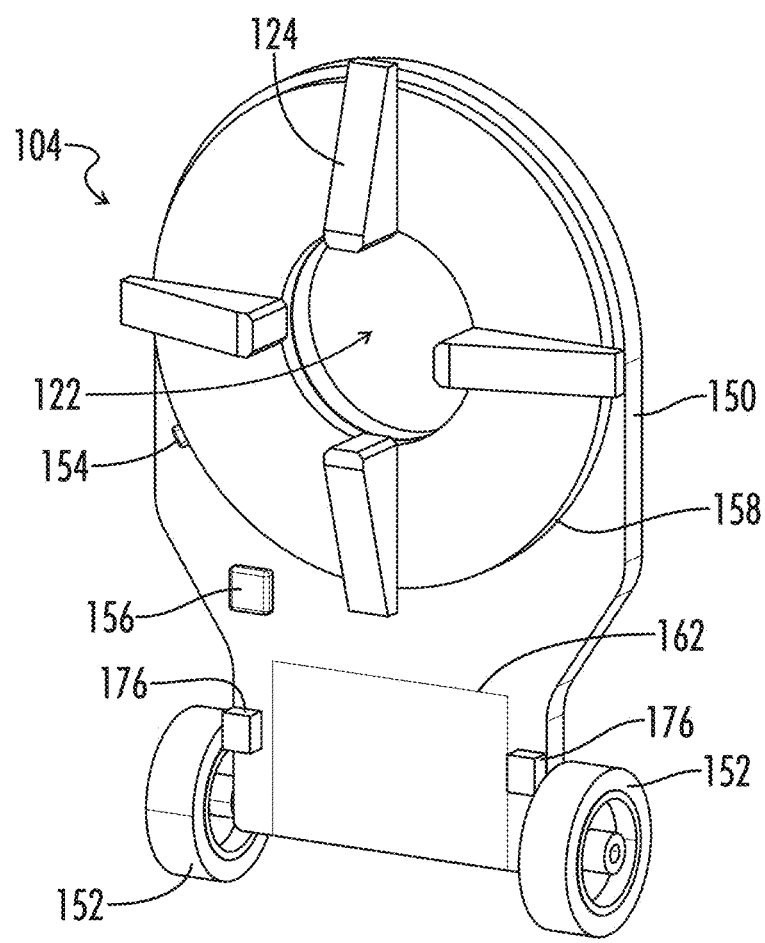
FIG. 4 is a perspective view of a first side of the rear assembly according to the embodiment of FIG. 1.

FIG. 4 illustrates an exemplary embodiment of a rear assembly 104 for the portable machine 100 as disclosed herein, including a first rear assembly baseplate 150 supported by a rolling assembly 152 and having coupled thereto a rotation sensor 154 in the exemplary form of a rear chuck encoder and a communications module 156 including for example a processor and/or transmitter. A second rear assembly baseplate 158 is further rotatably coupled with respect to the first rear assembly baseplate 150 and has a workpiece clamp/jaw device 124 further coupled thereto, wherein for example a workpiece 106 may be affixed to the rear assembly 104 to pull or push the rear assembly 104 along a surface as the workpiece 106 is caused to move by the actuator rollers 116, and further wherein a rotation of the workpiece 106 may be detected using for example the rotation sensor 154 based on a corresponding rotation of the second rear assembly baseplate 158. A target area 162 may also be provided with respect to the distance sensor 142 for the front assembly 102, for example to reflect a laser emission or with a corresponding RFID transceiver, etc.

To optimize the system, a machine 100 as disclosed herein may include further assorted sensors and algorithms to process the sensor inputs. In some embodiments, the system uses the combination of multiple types of sensors to better understand the state of the system to further capitalize on the ability of the hardware to miniaturize the functionality of other larger systems. Some example sensors are described in further detail below.

To allow the system to accurately modify different sections of the workpiece 106, various embodiments as disclosed herein are configured to track how the front and rear assemblies 102, 104 articulate relative to each other. A higher accuracy of that measurement may increase the resulting accuracy of the machined workpiece 106.

Figure 5:
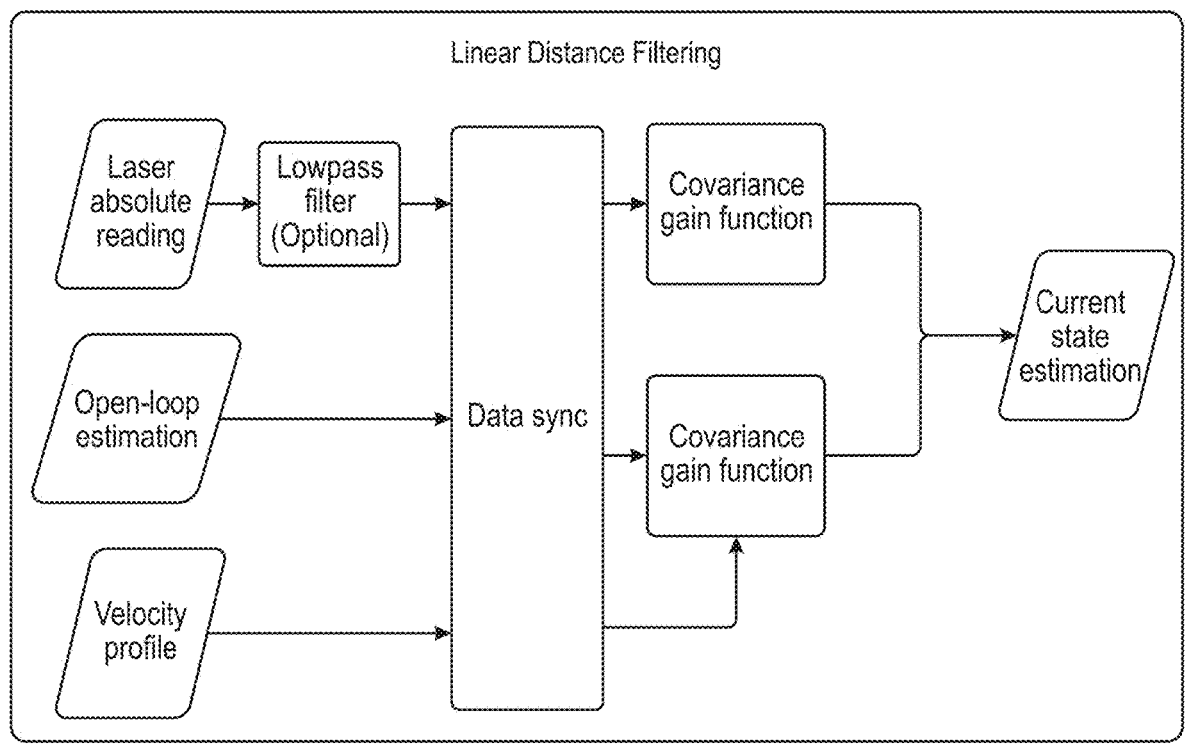
FIG. 5 is a block diagram representing exemplary control functionality according to the embodiment of FIG. 1.

In one exemplary embodiment, sensing the linear distance may involve measuring the rotation of the actuator rollers 116 relative to a starting point to infer the distance that the workpiece 106 in the machine 100 has moved. Tracking this type of movement may be highly accurate over short distances and further with respect to quick movements. Sensing the distance may further or in the alternative involve directly measuring the distance between the front assembly 102 and the rear assembly 104 using a distance sensor 142 such as a remote time-of-flight laser distance sensor. This sensing method is highly accurate over the entire range of the machine 100, but it is sometimes less accurate when measuring small, quick movements. In an embodiment, further by exemplary reference to an algorithm as illustrated in FIG. 5, the control module 128 of the portable machine 100 (or a separate processing unit in functional communication therewith) can fuse the different types of distance data together to produce an additional estimate of the current state (e.g., position) of one or more components of the portable machine 100. In some instances, this combined measurement can prove more accurate than either distance measurement achieves alone.

In various embodiments as disclosed herein it is also desirable to measure and monitor the rotational orientation of the workpiece 106, or in other words to determine the absolute orientation of the workpiece 106 in the rotational dimension. This may be useful to the extent different locations need to be machined and because in some embodiments of the actuator 108, the actuator 108 (e.g., friction drive) may cause the workpiece 106 to rotate relative to the second front assembly baseplate 140 as the workpiece 106 travels forward and backwards in the longitudinal direction, further potentially reducing the ability of the rotation of the front aperture 120 to represent the rotation of the workpiece 106. This rotational measurement may for example be provided using a rotation sensor 154 attached to the front assembly 102. This rotation assembly can measure the rotation of the front aperture 120 to represent the rotation of the workpiece 106. However, the actuator 108 may accidentally rotate the workpiece 106 in the front assembly aperture 120, introducing uncertainty as to whether the workpiece 106 has rotated the same amount as the rotation of the first front assembly baseplate 130, in other words reducing the ability of the rotation of the front aperture 120 to represent the rotation of the workpiece 106. Accordingly, in some embodiments the machine 100 may be configured to measure both the rotation of the front and the rear apertures 120, 122 to more accurately locate the workpiece 106 during machining operations.

In some embodiments, the rotation of the rear aperture 122 may be measured using a rotation sensor 154 attached to the rear assembly 104 as shown in FIG. 4.

Figure 6:
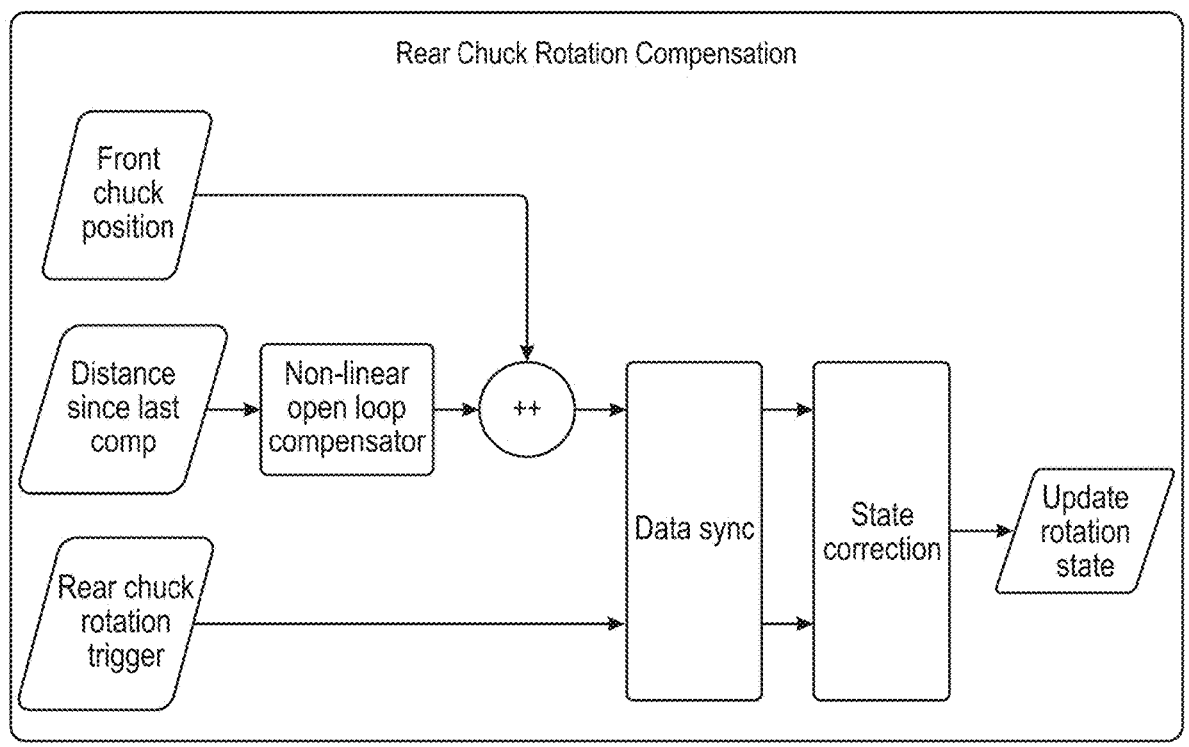
FIG. 6 is a block diagram representing further exemplary control functionality according to the embodiment of FIG. 1.

Referring to FIG. 6, an exemplary embodiment of a second rear assembly baseplate 158 rotation compensation workflow is disclosed. A second front assembly baseplate 140 position measurement is provided as described above and combined with an exemplary output from a non-linear open loop compensation block to further account for a distance traveled by the workpiece 106 (e.g., along its horizontal axis and with respect to the stationary front assembly 102) or otherwise a distance traveled by the rear assembly 104 (as theoretically approximating the distance traveled by the workpiece 106 along its horizontal axis) since a previous compensation step. The output from this combination is further provided as an input along with a second rear assembly baseplate 158 rotation trigger signal for processing in a data synchronization block to for example maintain consistency between the signals from disparate data sources. A state correction block follows to process the synchronized data and generate an updated rotation state which preferably accounts for the rotation of both of the front assembly 102 and the rear assembly 104 to more accurately locate the workpiece 106 during machining operations.

In addition to sensor fusion to increase the accuracy of measurements, the application of algorithms to interpret sensor data and make corresponding adjustments to the machine 100's normal operation is useful to extend the capabilities of the machine 100. The below are further examples of algorithms that may be implemented to the system controlling the machine 100.

In some embodiments, the portable machine 100 may implement an algorithm to better ensure that the machine 100 does not end up in a state where it may tip over or otherwise become unstable. Because of the portable nature of the machine 100 and its two-piece articulating configuration, it is possible that the machine 100 may tip over if a sufficiently heavy workpiece 106 is extended too far through the front assembly 102. In some embodiments, the control module 128 may accordingly be configured to consider the weight and dimensions of a workpiece 106, along with the weight and position of the respective machine components and a current and/or predicted position of the workpiece 106 during the project to dynamically determine if the machine 100 will become unstable. In the event the control module 128 determines the machine 100 may be unstable, it can prevent the machine 100 from moving to a position where it will be unstable. In another embodiment, the control module 128 can use an ongoing calculation and warn the user during configuration of the system that the project parameters are likely to result in an unstable condition. In other embodiments, the control module 128 may also generate output signals to trigger one or more safety mechanisms during movement of the machine 100 if necessary.

In some embodiments, an alignment algorithm may be included in addition to the machine stability algorithm. The alignment algorithm may for example be configured to estimate an amount that the workpiece 106 is misaligned relative to a centerline of the machine 100. The alignment algorithm may accordingly consider, e.g., material compression in the friction wheels, stiffness and bending of the workpiece 106, relative misalignment of the front and rear assemblies 102, 104 of the portable machine 100, and any other relevant factors as may be understood by one of skill in the art to calculate the actual position and/or orientation of the workpiece 106 during a project.

Figure 7:
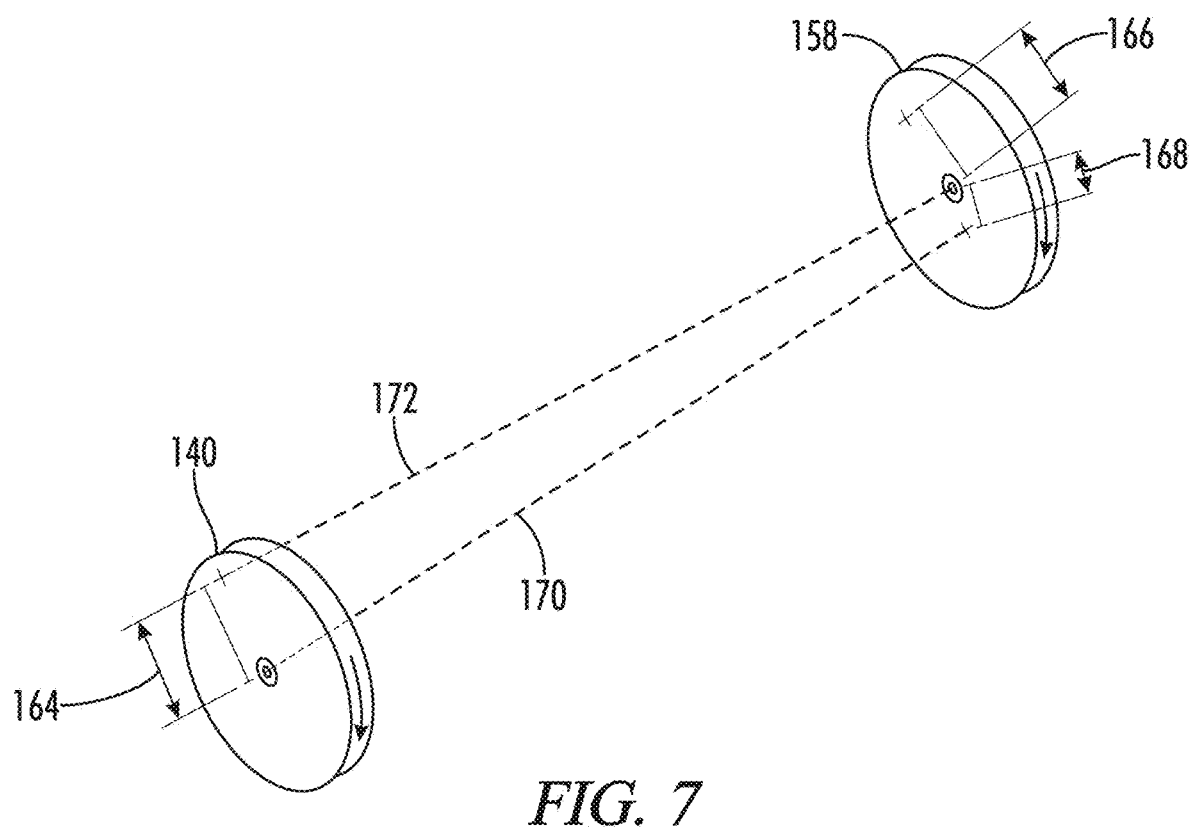
FIG. 7 is a perspective view of the second front baseplate and second rear baseplate and the rotational axes of the front and rear assemblies according to the embodiment of FIG. 1.

For example, the alignment algorithm may utilize calculations of offsets to model the alignment of the workpiece 106. Exemplary offsets include a front assembly-workpiece offset 164, a rear assembly-workpiece offset 166, and a rear assembly-front assembly rotational axes offset 168 as shown in FIG. 7. The front assembly-workpiece offset 164 defines the position at which the front assembly 102 holds the workpiece 106 relative to the center of the second front assembly baseplate 140. Similarly, the rear assembly-workpiece offset 166 defines the position at which the rear assembly 104 holds the workpiece 106 relative to the center of the second rear assembly baseplate 158. The rear assembly-front assembly rotational axes offset 168 defines the misalignment of the front assembly 102 and the rear assembly 104. The orientation for each assembly 102, 104 is represented using the rotational axis 170 of the front assembly 102 and the rotational axis 172 of the rear assembly 104. The front assembly 102 and the rear assembly 104 are misaligned when the rotational axes 170, 172 are not collinear. Thus, this misalignment can be represented as an offset from the rear assembly center of rotation to the point of intersection of the front assembly rotational axis 170 in the plane of rotation on the rear assembly 104.

To detect the offsets 164, 166, 168, a position sensor 174 is configured perpendicular to the axis of rotation 114 of the workpiece 106 as a function of the machine 100's rotational position. The position sensor 174 may be any appropriate sensor such as a camera or a distance sensor. In the embodiment using a camera, the camera 174 is configured to capture an image of a portion of the workpiece 106.

To determine the offsets 164, 166, 168, one or more images may be captured as the workpiece 106 rotates and moves axially. A memory (not shown) associated with the control module 128 may store a number of motion models that represent different combinations of the offsets 164, 166, 168. The control module 128 then compares the images captured by the camera 174 with the motion models and determines the motion model that best matches the images captured. Using the best-fit motion model, the control module 128 estimates the offsets 164, 166, 168. In other embodiments, a processor and memory associated with the position sensor 174 or any other appropriate processor and memory associated with the portable machine 100 may perform the analysis of the captured images.

Using the determined offsets 164, 166, 168, the control module 128 modifies the target parameters to take the offsets 164, 166, 168 into account to more accurately control the tooling unit 110, 112 relative to the workpiece 106. In some embodiments, the control module 128 may be configured to update the target parameters as part of an open loop such that the target parameters are updated at the beginning of the process. In another embodiment, the control module 128 may be configured to update the target parameters as part of a closed loop such that the position sensor determines the offsets throughout the machining process and the control module 128 uses the updated offset values to recalibrate the target parameters throughout the machining process. In another embodiment, the control module 128 may utilize a hybrid method that allows the portable machine 100 to operate in the open loop configuration within a certain set of parameters such as rotation and linear motion, after which a new calibration will be performed. The scope of the parameters can be determined either ahead of time via experimentation or in situ using the on board sensors and comparing the open and closed loop estimations to find the optimal scope of the parameters for the open loop configuration.

Using these inputs, the alignment algorithm can determine the alignment of the workpiece 106. This position then can be used to position the tools relative to the workpiece 106 to increase the accuracy of the produced component. For example, using the motion model, the target parameters may be adjusted based on the offsets 164, 166, 168. In some embodiments, the system may continually evaluate the offsets 164, 166, 168. This can lead to open loop, closed loop, or hybrid method.

In some embodiments, the rear assembly 104 may require additional active components 176 to remain aligned with the front assembly 102 as the workpiece 106 is traversed along its axis by the machine 100. This could be caused by manufacturing tolerances, uneven operating surfaces, or lack of rigidity in the workpiece 106 itself. In an embodiment, various aspects that can be considered when solving this problem include determining the presence of an alignment issue and the corrective actions necessary to bring the rear assembly 104 back into alignment. Having identified the alignment issue, the system engages an active component 176 to correct the alignment issue. The active component 176 may come in a number of different forms, including a steering mechanism physically acting on the idle wheels supporting the rear assembly 104, a differential drag based system, or other similar mechanisms. When using a differential drag based system, for example, the system can utilize an eddy current brake, friction brake, or some other equivalent configuration to provide steering via differential resistance applied to the idle wheels.

In some embodiments, when the needed steering is minimal to retain proper function, the control module 128 may determine that adjusting the target parameters may suitably compensate for the misalignment of the front assembly 102 and rear assembly 104. In this scenario, the control module 128 may adjust the target parameters using the offset algorithm described above and disable the active steering mechanisms 176 when the necessary adjustments can be made with the tooling unit 110, 112. Similar to the offset algorithm above, the control module 128 may make these adjustments and determinations using an open loop configuration, closed loop configuration, or a hybrid configuration.

After any features have been cut in a workpiece 106, it may be desirable in some embodiments to perform an inspection of the machined workpiece 106. This may be performed in various embodiments using for example on-board workpiece alignment sensors or additional optical sensors specifically designed for inspection purposes. In the embodiment including camera 174, the camera 174 may be used as the optical sensor. When using these sensors and verification algorithms, the machine 100 typically will not move the workpiece 106 linearly during the inspection process. This may for example be due to foreseeable inaccuracies in the rotation and/or distance when the friction drive is employed.

In contrast, when only rotational motions are performed, the motion of the workpiece 106 is more fully defined, and thus a more accurate inspection can be performed to validate the cut.

When using the camera 174 or similar device to inspect the workpiece 106, the camera 174 may generate image data by capturing a plurality of images while the workpiece 106 is rotated, capturing a video of the workpiece 106 while the workpiece 106 is rotated, or a combination of the images and video. The control module 128, or any other appropriate processor, may process the image data using computer vision techniques that build a digital representation of the tube in its final as cut form. The digital representation is then compared against the initial design and the control module 128 either determines that the workpiece 106 passes or fails. In some embodiments, the control module 128 may further determine that the workpiece 106 needs to be remachined and instructs the portable device to remachine the workpiece 106.

In some embodiments, a projector 178, such as a laser, projects a line or pattern oriented along the major axis 174 of the workpiece 106. The projected line or pattern is angled such that the end of the workpiece 106 when viewed from the camera 174 will create a clear end to the line segment in the image data. The projector 178 in some embodiments may be adjustable to align to the workpiece 106 when the workpiece 106 is misaligned in the portable machine 100. An example of an adjustable configuration is to utilize a dynamic masking or projection technique such as DLP or LCD. Another example may use a projected pattern, where the pattern may be corrected for in the control module 128. Utilizing the line or pattern reduces the necessary parameter tuning for proper edge detection of the workpiece 106.

A portable machine 100 in various embodiments as disclosed herein may also include designs that make user interaction with the machine 100 both simple and seamless. The user may interact with the machine 100 primarily through both a connected computer system and/or an on-board touch screen.

In one embodiment, a desktop application for interacting with the machine 100 is provided. The exemplary application may for example be configured for either of both of project design and machine configuration. The project design functionality may be broken into a Tube Library and an Assembly area. At step one of the project design function, the user first enters the specifications for project-wide stock materials that will be cut by the machine 100 into the Tube Library. At step two, the user can then place these materials into an assembly layout by placing tubes at positions and angles relative to the main tube to be cut. At this stage, the desktop application shows a 3D rendered preview of the project, enabling users to easily create jobs to cut with the machine 100, even if the user has little to no experience with Computer-Aided Design (CAD) programs, by allowing the user to define the project by specifying a handful of parameters. In some embodiments, a user may directly import a predetermined job and associated parameters from third-party CAD software. This feature could be useful, for example, for more complex jobs. In some embodiments, the configuration manager may be further used to manage machine firmware updates, calibration, and manual jogging of servos.

After uploading the project to the machine 100, the user can selectively initiate the job/project functions of the portable machine 100. In some embodiments, the application can use a contextual menu to guide the user through setup and operation of the project and machine 100. The user is shown a preview of the job, which may include color coding each solid body cut from the stock material in a unique shade. The program may next instruct the user to load the stock material into the machine 100 at a specific initial position. The program may then display or otherwise provide prompts or messages to remind the user to ensure that the laser distance sensor 142 on the front assembly 102 is centered on the reflective target on the rear assembly 104, that the machine 100 is on a flat surface, and that the locking mechanisms in the apertures are properly tightened.

Although the above described application is described in the context of a desktop application, other embodiments may provide access to the application through other channels. For example, a user may access the application using other auxiliary technology such as phones and tablets to access the configuration manager.

One additional route for interacting with the machine 100 may include the use of natural language processing to interpret user instructions for designing an assembly. This would be particularly beneficial while working in the field. For example, a user could speak aloud "cut me a two foot tube with a thirty-degree notch on one end," and the machine 100 would implement voice recognition and related software applications to ultimately display a job preview for user confirmation before cutting.

An exemplary utilization of one embodiment of the portable machine 100 as disclosed herein enables a user utilizing the machine 100 to modify the tube frame chassis of an off-road buggy in the field. The user may for example intend to modify the frame chassis by notching a length of raw steel tubing to fit the chassis. Users frequently need to perform such modifications to pass a technical inspection of a custom vehicle at an event or when they break components in the field and wish to replace or reinforce them on-site.

In a first step according to the above-referenced exemplary utilization, the user may unpack the machine 100 from an associated travel case, setting up the front and rear assemblies 102, 104 and associated components of the system. This compact two-piece design allows the functionality of a completely non-portable machine to be brought on-site, critically reducing the effect of setbacks from design/manufacturing mistakes as the mistakes can be fixed on the fly as they arise.

The user may subsequently then load a design for the desired component onto the machine 100 from an external source such a mobile phone or computer having a corresponding user interface. Using the loaded design and the built-in software to specify parameters such a workpiece diameter, wall thickness, and length, the machine plans and prepares for the notching operation.

Using the display on the machine 100, the portable machine 100 in embodiments as disclosed herein may next provide a visual walk through instructing the user on how to load the workpiece 106 and properly locate and calibrate the machine 100 prior to beginning the cutting process. The portable machine 100 may also be able to detect when one of the steps has not been performed properly, helping reduce human error and possible machine crashes as the machine.

Next, the user may confirm the parameters in the software, and the machine 100 performs the notching operation to produce the final component(s).

Finally, the user removes the finished component and installs it into the buggy chassis. The user can then complete any further prep work and weld the component to the existing structure. As a result, the machine 100 has enabled the user to make a major modification to the buggy in the field in a relatively short and painless process.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

The term "coupled" means at least either a direct physical or electrical connection between the connected items or an indirect connection through one or more passive or active intermediary devices.

The terms "controller" and "control module" as used herein may refer to, be embodied by or otherwise included within a machine 100, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of operating a portable machine for working a workpiece comprising the steps of:
   continuously measuring a distance between a front assembly and a rear assembly;
   generating control signals to a first actuator configured to move the workpiece in a first direction or an opposing second direction along the longitudinal axis, the control signals indicating the direction and distance to move the workpiece based on at least predetermined target parameters for working of the workpiece and the measured distance;
   measuring a first orientation of a first baseplate of the front assembly relative to a second baseplate of the front assembly;
   measuring a second orientation of a first baseplate of the rear assembly relative to a second baseplate of the rear assembly, wherein the first and second orientations correspond to rotation of the workpiece during the working thereof;
   generating control signals to a second actuator configured to rotate the second front assembly baseplate relative to the first front assembly baseplate in a first direction or a second opposing direction about the longitudinal axis, based on at least the predetermined target parameters for working of the workpiece and the measured first and second orientations;
   predicting a stability of one or more of the front assembly and the rear assembly, based on a determined weight and/or configuration of the workpiece further in combination with a determined weight and/or relative position of the front assembly and the rear assembly; and
   wherein one or more of the control signals to the first actuator and the control signals to the second actuator are adapted corresponding to a predicted stability being outside of one or more defined bounds.

2. The method of claim 1, wherein the distance is measured using a laser reflecting off a target area on the rear assembly.

3. The method of claim 2, wherein the distance is further measured by monitoring the movement of the first actuator relative to a starting point to measure the longitudinal distance travelled by the workpiece, in combination with the distance measurements via the laser.

4. The method of claim 1, wherein the distance is measured by monitoring the movement of the first actuator relative to a defined starting point to measure the longitudinal distance travelled by the workpiece.

5. The method of claim 1, further comprising:
   generating an output signal corresponding to the predicted stability being outside of one or more defined bounds, wherein the output signal is provided to a display unit for generating a user alert.

6. The method of claim 1, further comprising generating an output signal corresponding to the predicted stability being outside of one or more defined bounds, wherein the output signal is provided to trigger a safety mechanism during movement of the machine.

* * * * *